US012682916B1

(12) United States Patent
Bingham et al.

(10) Patent No.: US 12,682,916 B1
(45) Date of Patent: Jul. 14, 2026

(54) METHODS AND SYSTEMS FOR USING MACHINE LEARNING MODELS TO DETECT ANOMALIES AND PREDICT TRENDS IN SPEECH DATA

(71) Applicant: Peter Cohen Foundation, Seattle, WA (US)

(72) Inventors: Indu Navar Bingham, Los Altos, CA (US); Julián Peller, Buenos Aires (AR); Esteban Gabriel Roitberg, Provincia de Buenos Aires (AR); Ernest Samuel Fraenkel, Newton, MA (US)

(73) Assignee: Peter Cohen Foundation, Seattle, WA (US)

( * ) Notice: Subject to any disclaimer, the term of this patent is extended or adjusted under 35 U.S.C. 154(b) by 0 days.

(21) Appl. No.: 19/170,611

(22) Filed: Apr. 4, 2025

Related U.S. Application Data

(60) Provisional application No. 63/632,802, filed on Apr. 11, 2024.

(51) Int. Cl.
| | |
|---|---|
| *G10L 25/48* | (2013.01) |
| *G10L 15/26* | (2006.01) |
| *G10L 25/30* | (2013.01) |

(52) U.S. Cl.
CPC .............. *G10L 25/48* (2013.01); *G10L 15/26* (2013.01); *G10L 25/30* (2013.01)

(58) Field of Classification Search
CPC ......... G10L 25/48; G10L 15/26; G10L 25/30; G10L 25/66; A61B 5/4803; A61B 5/4088
See application file for complete search history.

(56) References Cited

U.S. PATENT DOCUMENTS

| | | |
|---|---|---|
| D757,772 S | 5/2016 | Jin |
| D816,715 S | 5/2018 | Martin et al. |
| D822,048 S | 7/2018 | Spikman et al. |

(Continued)

FOREIGN PATENT DOCUMENTS

| | | |
|---|---|---|
| CN | 306336484 | 2/2021 |
| CN | 306620916 | 6/2021 |

(Continued)

OTHER PUBLICATIONS

EverythingALS, "Dr. Terry Heiman-Patterson discussing the EverythingALS App Nutrition Module," LinkedIn Posts, published on Apr. 4, 2025 [online]. Retrieved from www.linkedin.com/posts/everythingals_als-nutrition-alsresearch-activity-7313187440846909442-4LDE, [retrieved on Apr. 10, 2025]; 1 page.

(Continued)

*Primary Examiner* — Mark Villena
(74) *Attorney, Agent, or Firm* — COOLEY LLP

(57) ABSTRACT

A non-transitory processor-readable medium stores instructions that, when executed by a processor, cause the processor to receive audio data and provide the audio data as input to a first machine learning model to generate (1) transcription data, (2) timestamp data associated with the transcription data, and (3) a confidence metric associated with the transcription data. A speaking metric is calculated based on the transcription data and the timestamp data. The speaking metric and the confidence metric are provided as input to a second machine learning model to predict a listener effort metric.

20 Claims, 9 Drawing Sheets

(56)                    References Cited

U.S. PATENT DOCUMENTS

| D826,251 | S | 8/2018 | Mancuso et al. |
| D841,663 | S | 2/2019 | Yuguchi et al. |
| D843,403 | S | 3/2019 | Casse et al. |
| D851,119 | S | 6/2019 | Rickes et al. |
| D879,820 | S | 3/2020 | Descheneaux et al. |
| D880,506 | S | 4/2020 | Watson et al. |
| D882,602 | S | 4/2020 | Bessette et al. |
| D890,775 | S | 7/2020 | Clay |
| D891,459 | S | 7/2020 | Suzuki |
| D913,312 | S | 3/2021 | Mariani et al. |
| D914,740 | S | 3/2021 | Clymer et al. |
| D936,093 | S | 11/2021 | Na et al. |
| D936,693 | S | 11/2021 | Li |
| D938,459 | S | 12/2021 | Niu |
| D938,478 | S | 12/2021 | Childress |
| D946,033 | S | 3/2022 | Trenkner et al. |
| D960,924 | S | 8/2022 | Nordstrom et al. |
| D962,274 | S | 8/2022 | Pineda-Madrid, II et al. |
| D966,329 | S | 10/2022 | Yue et al. |
| D971,941 | S | 12/2022 | Yoo et al. |
| D978,180 | S | 2/2023 | Woo et al. |
| D984,470 | S | 4/2023 | Wines et al. |
| 2023/0034517 | A1* | 2/2023 | Kumamoto ............. G10L 25/66 |
| 2023/0190177 | A1* | 6/2023 | Shor .................... A61B 5/4839 |
| | | | 600/529 |
| 2023/0403418 | A1 | 12/2023 | Regairaz |
| 2024/0023877 | A1* | 1/2024 | Zaldua ................... G16H 10/20 |
| 2024/0180482 | A1* | 6/2024 | Stegmann ............... G06F 40/30 |
| 2024/0185861 | A1* | 6/2024 | Weston .................. G10L 17/22 |
| 2025/0182742 | A1* | 6/2025 | Morikawa ............. G10L 13/027 |
| 2025/0182773 | A1* | 6/2025 | Kurtz ...................... G10L 25/84 |

FOREIGN PATENT DOCUMENTS

| CN | 307853844 | 2/2023 |
| CN | 308721883 | 7/2024 |
| CN | 309057172 | 1/2025 |
| CN | 309099731 | 2/2025 |
| JP | D1710187 | 3/2022 |

OTHER PUBLICATIONS

EverythingALS.org, "A patient-focused non-profit bringing techno-logical innovations and data science to support efforts, from care to cure, for people with ALS," first publication date unknown [online]. Retrieved from https://www.everythingals.org/, [retrieved on Apr. 10, 2025]; 1 page.

Norm, "Simple Sliders," Dribbble, first publication date unknown [online]. Retrieved from https://dribbble.com/shots/205791-Simple-Sliders?list=following, [retrieved on Apr. 10, 2025]; 1 page.

VectorStock.com, "Progress bar and slider ui element template vector image," Image ID: 45097777, first publication date unknown [online]. Retrieved from https://www.vectorstock.com/royalty-free-vector/progress-bar-and-slider-ui-element-template-vector-45097777, [retrieved on Apr. 10, 2025]; 1 page.

Arseniuk, O., "Minimized video player bar or audio player control panel," RF ID: 2RF8NGN, Alamy.com, first publication date unknown [online]. Retrieved from https://www.alamy.com/minimized-video-player-bar-or-audio-player-control-panel-image560144165.html, [retrieved on May 23, 2025]; 2 pages.

Visual Paradigm Online, "Music App," first publication date unknown [online]. Retrieved from hllps://online.visual-paradigm.com/diagrams/templates/ios-wireframe/music-app/, [retrieved on Apr. 10, 2025]; 1 page.

* cited by examiner

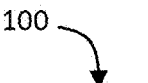
100
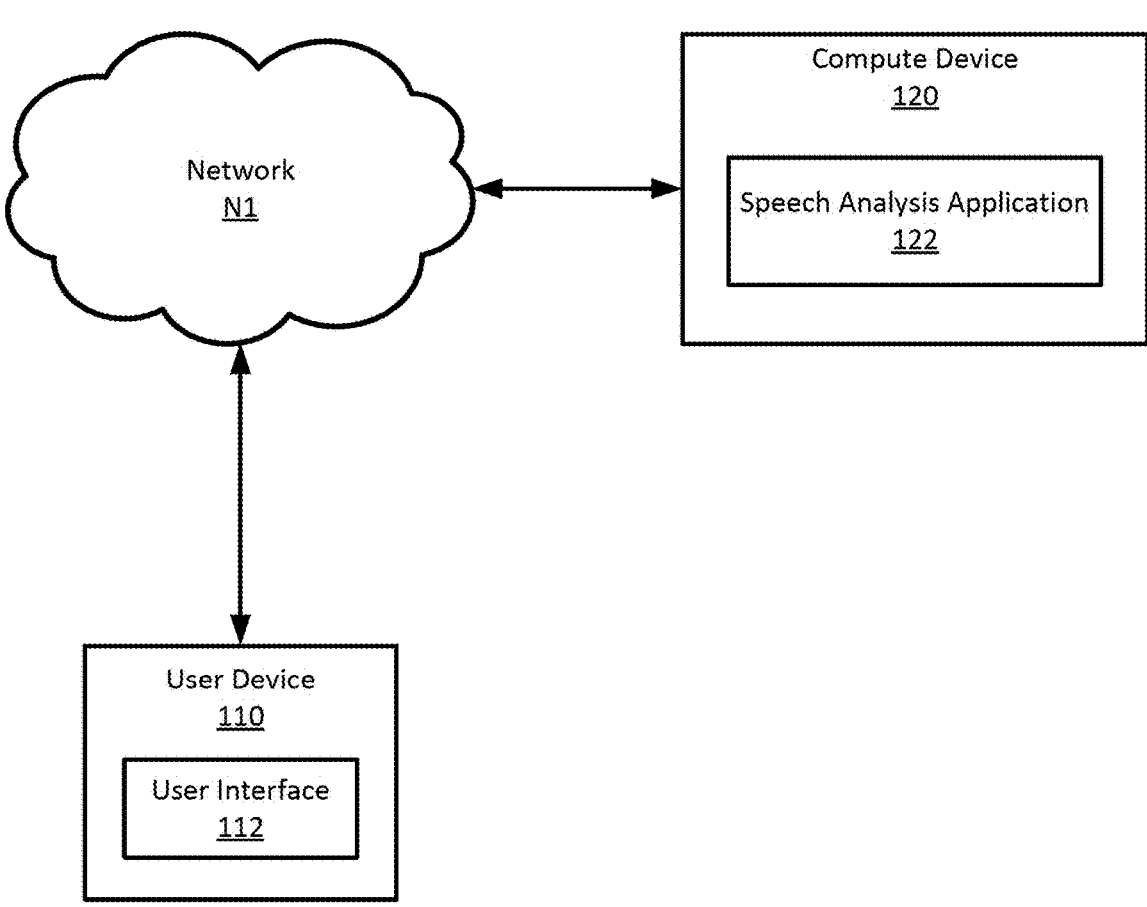
Network
N1
Compute Device
120
Speech Analysis Application
122
User Device
110
User Interface
112
FIG. 1

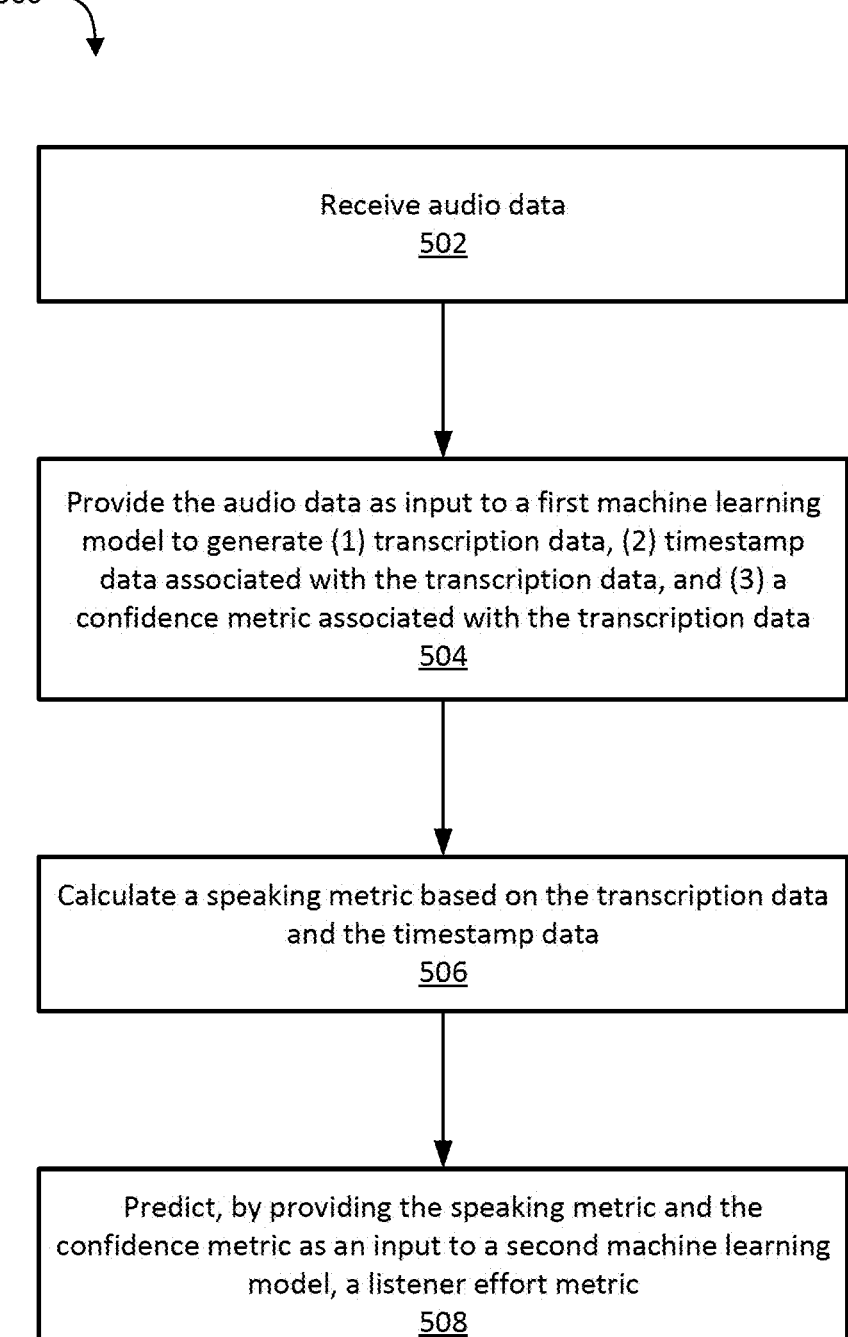

500

Receive audio data
502

Provide the audio data as input to a first machine learning model to generate (1) transcription data, (2) timestamp data associated with the transcription data, and (3) a confidence metric associated with the transcription data
504

Calculate a speaking metric based on the transcription data and the timestamp data
506

Predict, by providing the speaking metric and the confidence metric as an input to a second machine learning model, a listener effort metric
508

FIG. 5

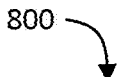
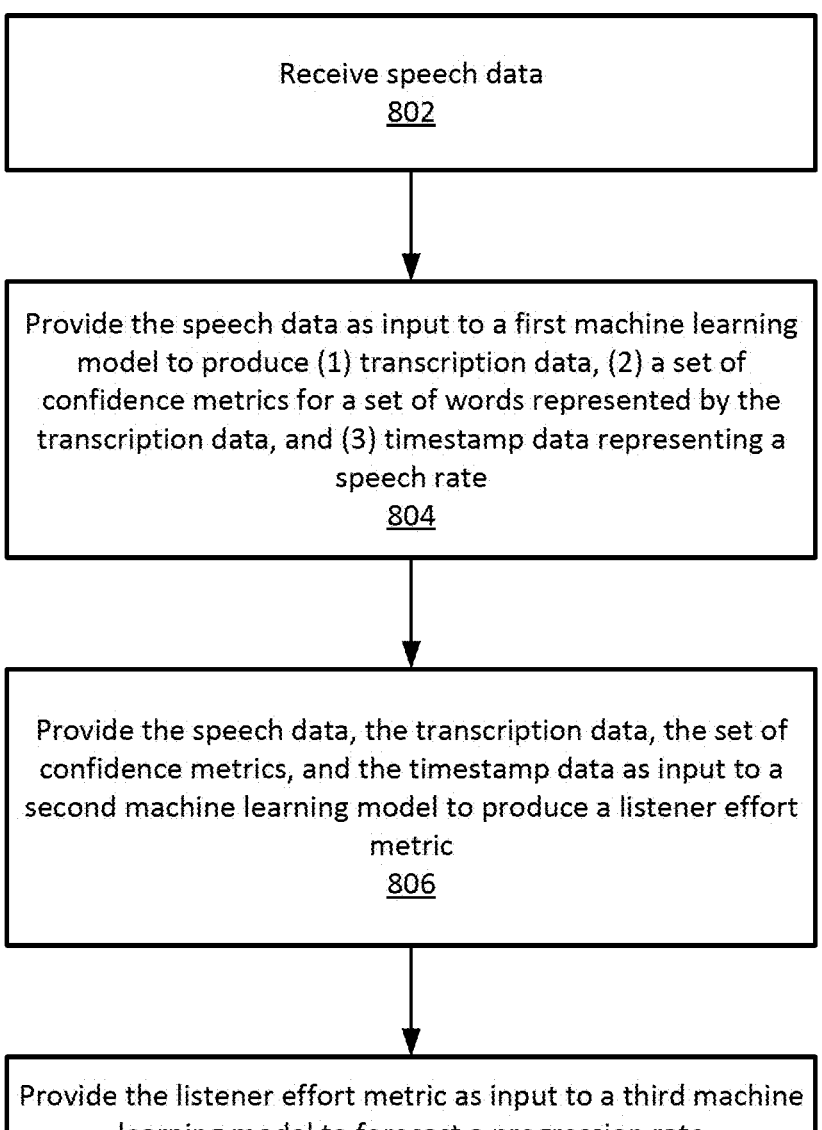
FIG. 8

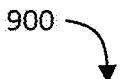
900
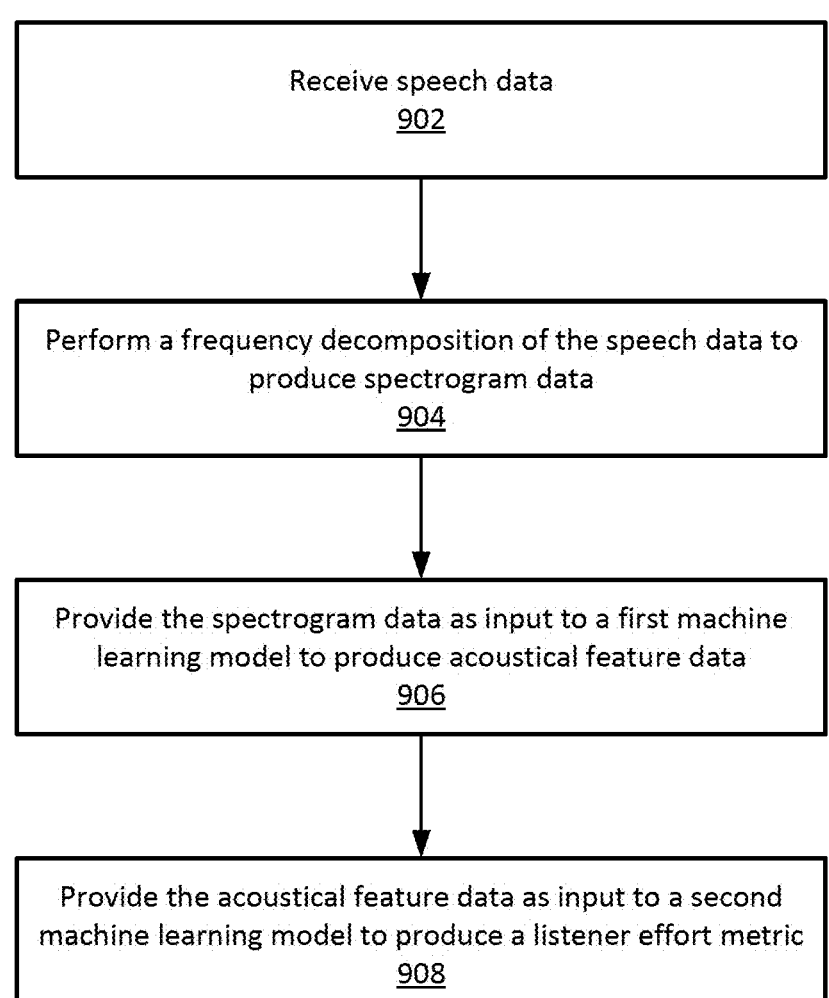
Receive speech data
902
Perform a frequency decomposition of the speech data to produce spectrogram data
904
Provide the spectrogram data as input to a first machine learning model to produce acoustical feature data
906
Provide the acoustical feature data as input to a second machine learning model to produce a listener effort metric
908
FIG. 9

METHODS AND SYSTEMS FOR USING MACHINE LEARNING MODELS TO DETECT ANOMALIES AND PREDICT TRENDS IN SPEECH DATA

CROSS-REFERENCE TO RELATED APPLICATION

This application claims priority to and the benefit of U.S. Provisional Application No. 63/632,802, filed Apr. 11, 2024, and titled "Methods and Systems for Using Machine Learning Models to Detect Anomalies and Predict Trends in Speech Data," which is incorporated herein by reference.

BACKGROUND

Some embodiments described herein relate to methods and systems for analyzing speech data, generating listener effort metrics, and/or predicting progression rates.

SUMMARY

In some embodiments, a non-transitory processor-readable medium stores instructions that, when executed by a processor, cause the processor to receive audio data and provide the audio data as input to a first machine learning model to generate (1) transcription data, (2) timestamp data associated with the transcription data, and (3) a confidence metric associated with the transcription data. A speaking metric is calculated based on the transcription data and the timestamp data. The speaking metric and the confidence metric are provided as input to a second machine learning model to predict a listener effort metric.

In some embodiments, a method includes receiving speech data and providing the speech data as input to a first machine learning model to produce (1) transcription data, (2) a set of confidence metrics for a set of words represented by the transcription data, and (3) timestamp data representing a speech rate. The method further includes providing the speech data, the transcription data, the set of confidence metrics, and the timestamp data as input to a second machine learning model to produce a listener effort metric. The listener effort metric is provided as input to a third machine learning model to forecast a progression rate.

In some embodiments, a non-transitory, processor-readable medium stores instructions that, when executed by a processor, cause the processor to receive speech data and perform a frequency decomposition of the speech data to produce spectrogram data. The spectrogram data is provided as input to a first machine learning model to produce acoustical feature data, and the acoustical feature data is provided as input to a second machine learning model to produce a listener effort metric.

BRIEF DESCRIPTION OF THE DRAWINGS

FIG. 1 is a schematic diagram of a speech analysis system, according to an embodiment.

FIG. 5 is a flowchart showing a method of using a speech analysis system to generate a listener effort metric, according to an embodiment.

FIG. 8 is a flowchart showing a method of using a speech analysis system to forecast a progression rate, according to an embodiment.

FIG. 9 is a flowchart showing a method of using a speech analysis system to produce a listener effort metric based on frequency decomposition of speech data, according to an embodiment.

DETAILED DESCRIPTION

Figure 2:
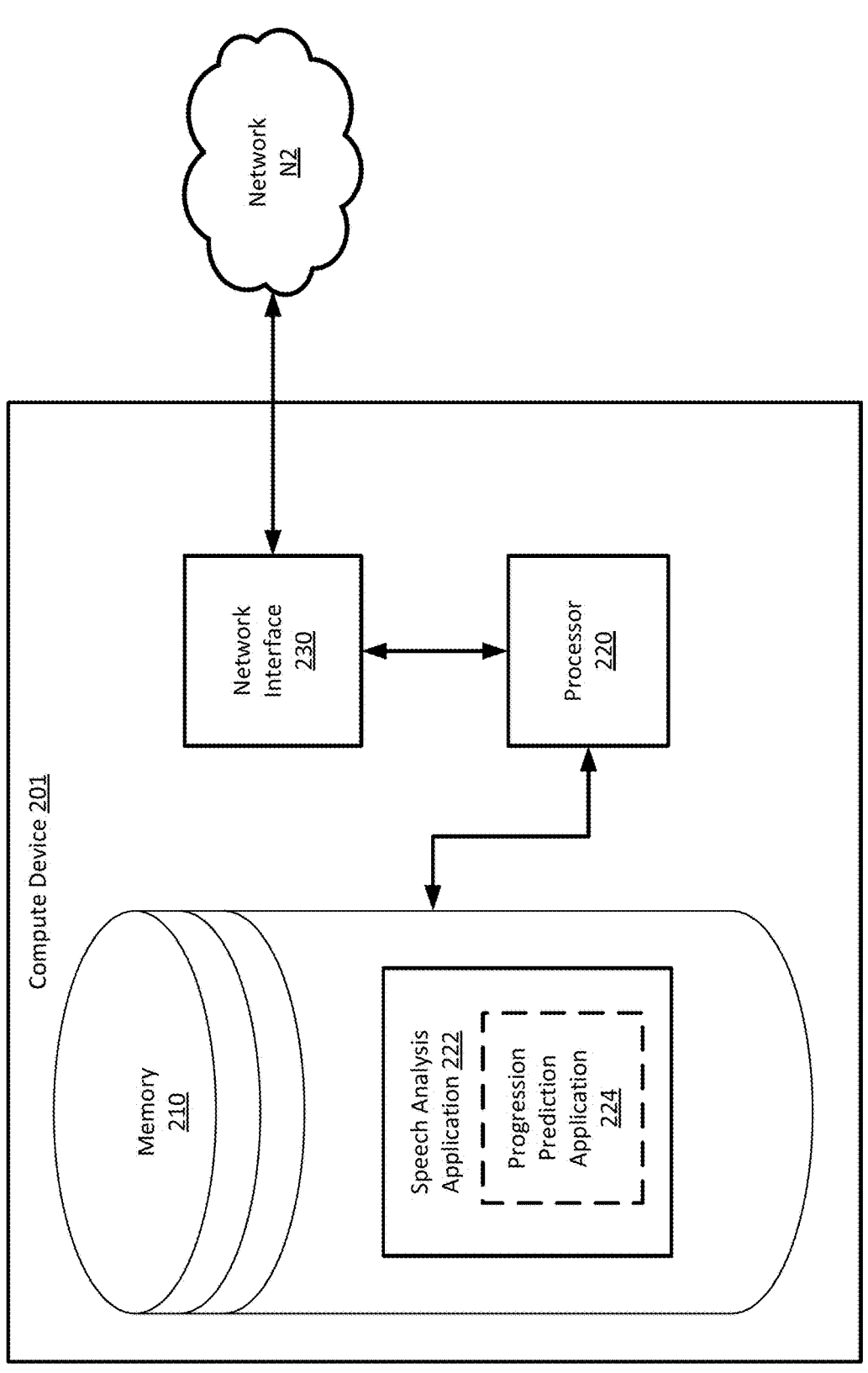
FIG. 2 is a schematic diagram of a compute device included in a speech analysis system, according to an embodiment.

Neurodegenerative and/or motor neuron diseases, such as Amyotrophic Lateral Sclerosis (ALS), Huntington's disease, Parkinson's disease, Alzheimer's disease, and/or the like, can cause progressive muscle weakness as a result of, for example, bulbar dysfunction. In some instances, progressive bulbar dysfunction can be marked by progressive complex dysarthria, which can lead to social isolation, reduced quality of life, etc. Some known methods of quantifying disease progression, such as the ALS Functional Rating Scale-Revised (ALSFRS-R), have a small dynamic range and low granularity and are scored subjectively. As a result, these known methods do not adequately predict the progression of dysarthria, particularly since dysarthria can be caused by dysfunction in any one or more speech subsystems (e.g., articulatory, resonatory, phonatory, respiratory, etc.). Complex disorders, such as ALS, can cause these one or more speech subsystems to decline at different rates, and compensatory mechanisms can further complicate patterns of dysarthria. Moreover, these known methods typically use patient recorded outcomes, and a patient's lack of self-awareness can affect accuracy. Other known methods of quantifying speech, such as quantitative motor speech (QMS) analysis, can quantify characteristics or features of speech, such as rate, pause, or articulation. However, QMS analysis can be insufficient for quantifying neurodegenerative and/or motor neuron diseases, such as ALS, over time. For example, speaking rate and articulatory pattern consistency can have complex, reciprocal dynamics within a given patient. Thus, there is a need for improved methods and systems for quantifying dysarthria and predicting progression of symptoms associated with neurodegenerative and/or motor neuron diseases.

FIG. 1 is a schematic diagram of a speech analysis system 100 configured to generate listener effort metrics and predict progression rates based on received inputs, according to an embodiment. The speech analysis system 100 includes a user device 110, a compute device 120, and a network N1. The speech analysis system 100 can include alternative configurations, and various steps and/or functions of the processes described below can be shared among the various devices of the speech analysis system 100 or can be assigned to specific devices (e.g., the user device 110, the compute device 120, and/or the like). For example, in some configurations, a user can provide inputs directly to the compute device 120 rather than via the user device 110, as described herein.

In some embodiments, the user device 110 and/or the compute device 120 can include any suitable hardware-based computing devices and/or multimedia devices, such as, for example, a server, a desktop compute device, a smartphone, a tablet, a wearable device, a laptop and/or the like. In some implementations, the user device 110 and/or the compute device 120 can be implemented at an edge node or other remote computing facility. In some implementations, each of the user device 110 and/or compute device 120 can be a data center or other control facility configured to run and/or execute a distributed computing system and can communicate with other compute devices.

In some implementations, the user device 110 can include a peripheral device(s) (not shown in FIG. 1) configured to receive an input from a user. For example, the user device 110 can include a microphone that the user can use to record and/or generate audio (e.g., speech) data or an imaging device that can be used to generate image data and/or video data, to be analyzed by the compute device 120. For example, the user device 110 and/or the compute device 120 can perform speech analysis using a speech analysis application 122 (described herein). Moreover, for another example, the user device 110 and/or the compute device 120 can augment speech analysis by using facial recognition techniques to infer a user's disease classification (e.g., a diagnosis) and/or a disease quantification (e.g., a prognosis). In another implementation, the user device 110 can include a user interface 112 that a user can use to receive an instruction prompt(s) (e.g., by viewing sample text to be recited by the user, viewing a picture to be described by the user, listening to audio to be repeated by the user, etc.). In response to receiving the instruction prompt(s), the user can use the user interface 112 to record speech data communicated by the user.

The compute device 120 can be configured to generate a listener effort metric, a progression rate, etc., based on input data received from the user (e.g., via the user device 110). For example, the compute device 120 can be configured to execute (e.g., via a processor) a speech analysis application 122, which can be functionally and/or structurally equivalent to the speech analysis application 222 of FIG. 2, described herein. The speech analysis application 122 can be implemented via software and/or hardware and can use one or more machine learning models to generate one or more predictions based on input data (e.g., speech data) received from the user device 110. Specifically, as described herein (e.g., in relation to FIGS. 2-4), the speech analysis application 122 can generate, based on audio data received from the user device 110, transcription data, timestamp data associated with the transcription data, and/or a confidence metric associated with the transcription data. The speech analysis application 122 can be further configured to calculate a speaking metric based on the transcription data and the timestamp data and predict a listener effort metric based on the confidence metric and the speaking metric. In some implementations, the speech analysis application 122 can be further configured to predict a progression rate based on the listener effort metric.

The user device 110 can be networked and/or communicatively coupled to the compute device 120, via the network N1, directly using wired connections and/or wireless connections. The network N1 can include various configurations and protocols, including, for example, short range communication protocols, Bluetooth®, Bluetooth® LE, the Internet, World Wide Web, intranets, virtual private networks, wide area networks, local networks, private networks using communication protocols proprietary to one or more companies, Ethernet, WiFi and/or HTTP, cellular data networks, satellite networks, free space optical networks and/or various combinations of the foregoing. Such communication can be facilitated by any device capable of transmitting data to and from other compute devices, such as a modem(s) and/or a wireless interface(s).

In some implementations, although not shown in FIG. 1, the speech analysis system 100 can include a plurality of user devices 110 and/or compute devices 120. For example, in some implementations, the speech analysis system 100 can include a plurality of user devices 110, where each user device 110 can be associated with a different user from a plurality of users. In some implementations, a plurality of user devices 110 can be associated with a single user, where each user device 110 can be associated with, for example, a different input modality (e.g., text input, audio input, video input, etc.).

FIG. 2 is a schematic diagram of a compute device 201 that can be included in a speech analysis system, according to an embodiment. The compute device 201 can be structurally and/or functionally similar to, for example, the compute device 120 of the speech analysis system 100 shown in FIG. 1. The compute device 201 can be a hardware-based computing device, a multimedia device, or a cloud-based device such as, for example, a computer device, a server, a desktop compute device, a laptop, a smartphone, a tablet, a wearable device, a remote computing infrastructure, and/or the like. The compute device 201 includes a memory 210, a processor 220, and a network interface 230 operably coupled to a network N2.

The processor 220 can be, for example, a hardware based integrated circuit (IC), or any other suitable processing device configured to run and/or execute a set of instructions or code (e.g., stored in memory 210). For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a graphics processing unit (GPU), a programmable logic controller (PLC), a remote cluster of one or more processors associated with a cloud-based computing infrastructure and/or the like. The processor 220 is operatively coupled to the memory 210 (described herein). In some embodiments, for example, the processor 220 can be coupled to the memory 210 through a system bus (for example, address bus, data bus and/or control bus).

The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like. In some implementations, the memory 210 can be a portable memory (e.g., a flash drive, a portable hard disk, and/or the like) that can be operatively coupled to the processor 220. In some instances, the memory can be remotely operatively coupled with the compute device 201, for example, via the network interface 230. For example, a remote database server can be operatively coupled to the compute device 201.

The memory 210 can store various instructions associated with processes, algorithms and/or data, including machine learning models (e.g., a neural network, a regression model, a speech recognition model, etc., as described herein). Memory 210 can further include any non-transitory computer-readable storage medium for storing data and/or software that is executable by processor 220, and/or any other medium which may be used to store information that may be accessed by processor 220 to control the operation of the compute device 201. For example, the memory 210 can store data associated with a speech analysis application 212. The speech analysis application 222 can be functionally and/or structurally similar to the speech analysis application 122 of FIG. 1 and/or the speech analysis application 322 of FIG. 3, described herein.

The speech analysis application 222 can optionally include a progression prediction application 224. The progression prediction application 224 can be functionally and/or structurally similar to the progression prediction application 324 of FIG. 3, described in further detail herein. As described herein, the speech analysis application 222 can be configured to generate a listener effort metric, and the progression prediction application 224 can be configured to generate a progression rate (and/or another indication of a trend, as described herein) based on the listener effort metric.

The network interface 230 can be configured to connect to the network N2, which can be functionally and/or structurally similar to the network N1 of FIG. 1. For example, network N2 can use any of the wired and wireless short range communication protocols described above with respect to network N1 of FIG. 1.

In some instances, the compute device 201 can further include a display, an input device, and/or an output interface (not shown in FIG. 2). The display can be any display device by which the compute device 201 can output and/or display data. The input device can include a mouse, keyboard, touch screen, voice interface, and/or any other hand-held controller or device or interface via which a user may interact with the compute device 201. The output interface can include a bus, port, and/or other interfaces by which the compute device 201 may connect to and/or output data to other devices and/or peripherals, such as a speaker.

Figure 3:
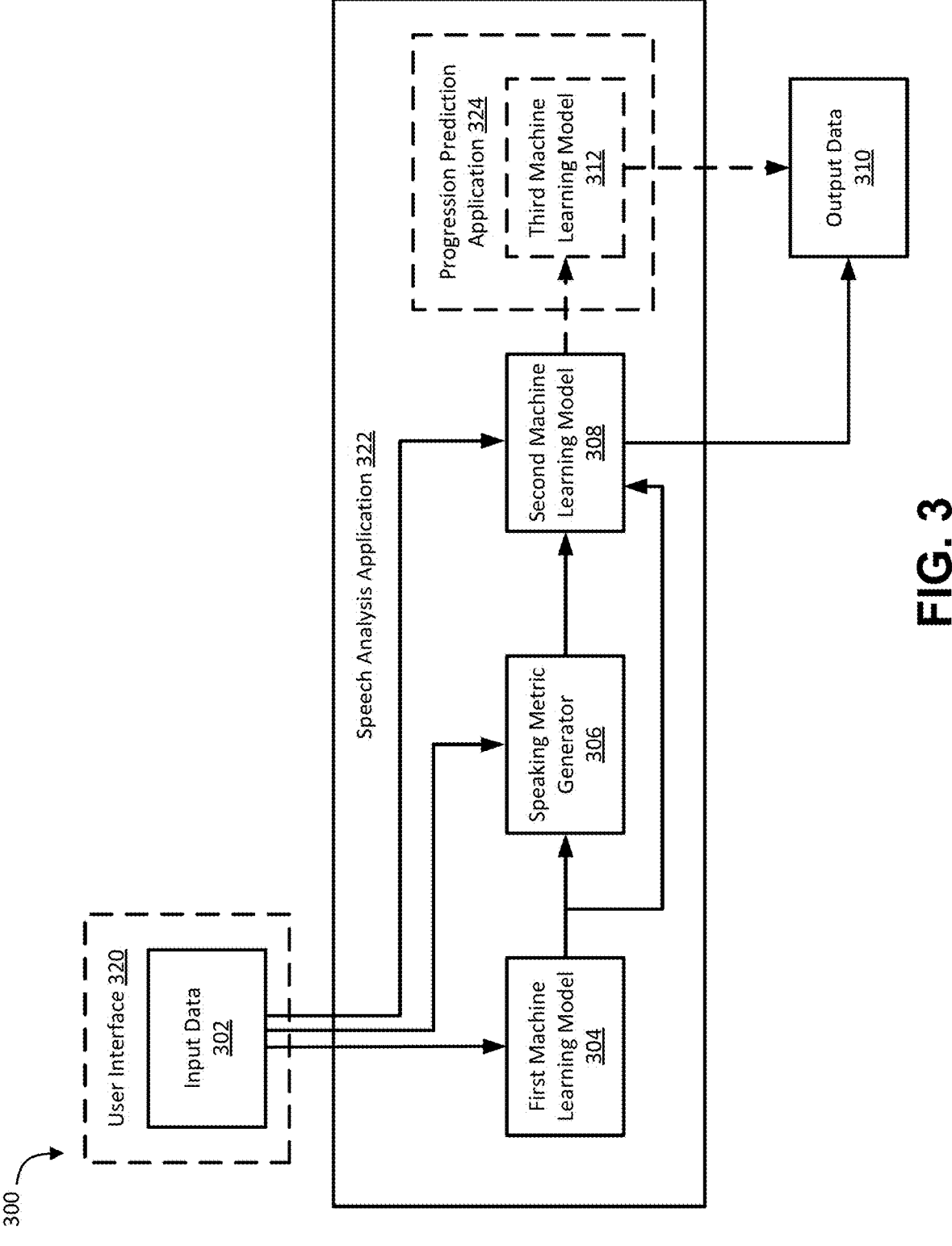
FIG. 3 is a schematic diagram of speech analysis components that are included in a speech analysis system, according to an embodiment.

FIG. 3 is a schematic diagram of speech analysis components 300, according to an embodiment. The speech analysis components 300 can be associated with a compute device (e.g., a compute device that is structurally and/or functionally similar to the compute device 201 of FIG. 2 and/or the user compute device 110 and/or the compute devices 120 of FIG. 1). In some instances, for example, the speech analysis components 300 can be software stored in memory 210 and configured to execute via the processor 220 of FIG. 2. In some instances, for example, at least a portion of the speech analysis components 300 can be implemented in hardware. The speech analysis components include input data 302, a speech analysis application 322, and output data 310. Optionally, the input data 302 can be associated with a user interface 320, which can be structurally and/or functionally equivalent to the user interface 112 of FIG. 1. For example, the input data 302 can be received via the user interface 320, as described herein. The speech analysis application 322 can be structurally and/or functionally similar to the speech analysis application 122 of FIG. 1 and/or the speech analysis application 222 of FIG. 2. The speech analysis application 322 can include a first machine learning model 304, a speaking metric generator 306, and a second machine learning model 308. Optionally, the speech analysis application 322 can further include a progression prediction application 324, which can be structurally and/or functionally equivalent to the progression prediction application 224 of FIG. 2.

The input data 302 can include audio data received from a user. In some instances, for example, the user can be diagnosed with and/or exhibit symptoms associated with a neurodegenerative and/or motor neuron disease, such as ALS, Alzheimer's disease, Huntington's disease, Parkinson's disease and/or the like, and the user can speak into a microphone to generate the audio data. In some implementations, the user can use the user interface 320 to capture the audio data. For example, the user interface 320 can be implemented by a compute device that is structurally and/or functionally equivalent to the user device 110. A user can initiate a recording function (e.g., by selecting a selectable element implemented by the user interface 320) via the user interface 320 to record audio via a microphone included in the compute device. The user interface 320 can further cause display of information to the user via a display operably coupled to the compute device. Such information can include, for example, text (e.g., a passage), an image, and/or the like, that a user can audibly recite and/or describe to generate audio data captured via the microphone. In some implementations, the speech analysis application 322 can be configured to normalize (e.g., adjust the gain of) the audio data included in the input data 302 to, for example, have a consistent amplitude to improve inferencing accuracy.

In some implementations, the input data 302 can further include data received from, for example, a health professional (e.g., a speech-language pathologist) and/or the like. For example, a health professional can perform a qualitative and/or quantitative assessment of the user's speech and provide assessment data to the speech analysis application 322. The speech analysis application 322 can be configured to use the assessment data as a baseline to predict a progression rate (described herein), as training data to train one or more machine learning models (described herein), and/or the like. In some implementations, the user interface 320, which can be functionally and/or structurally similar to the graphical user interface (GUI) 600 of FIG. 6 (described herein), can implement a selectable element (e.g., a slider displayed via a touchscreen, such as the slider 602 of FIG. 6, described herein) that the health professional can interact with to define a listener effort metric (described herein) as part of the input data 302.

In some implementations, the input data 302 can include image data (e.g., depicting a user's face) and/or video data (e.g., depicting a user's movements), and the speech analysis application 322 can be configured to predict, for example, a disease quantification (e.g., a prognosis) and/or progression rate based on the image data and/or video data in addition to the audio data included in the input data 302. For example, the image data and/or video data can be provided as an input to the second machine learning model 308, which can include a convolutional neural network (CNN) and/or a similarly suited model for processing image and/or video data, to asset in generating a listener effort metric (described further herein) (e.g., in conjunction with the audio data). Alternatively or in addition, the image data and/or video data can be provided as an input to the second machine learning model 308, which can include a CNN and/or a similarly suited model for processing image and/or video data, to generate a progression rate (described further herein) (e.g., in conjunction with the audio data). A CNN can be trained to generate, at least in part, a listener effort metric and/or a progression rate, based on, for example, image data and/or video data depicting other users with known listener effort metrics (e.g., as determined by a health professional, such as a speech-language pathologist). In some implementations, the speech analysis application 322 can be configured to perform facial landmark analysis to identify features in the image data and/or video data, and these features can be used (e.g., in addition to speech data) to generate listener effort metrics, progression rates, and/or the like.

The first machine learning model 304 can be configured to generate, based on audio data (e.g., speech data) included in the input data 302, at least one of transcription data, timestamp data associated with the transcription data, and/or confidence data associated with the transcription data. The first machine learning model 304 can include a speech recognition model, a speech-to-text model, an encoder-decoder model, a transformer model and/or the like. Example implementations of the first machine learning model 304 can include a Whisper model and/or a model similarly suited for transcribing audio data. The transcription data can include a set of words transcribed from the audio data. The timestamp data can indicate a relative time that a transcribed word was captured in the audio data as compared to other transcribed words captured in the audio data. For example, the user can utter a first word followed by a second word while the speech analysis application 322 records the audio data. As a result, the first machine learning model 304 can generate a first timestamp for the first word and, for the second word, a second timestamp that indicates a later time than the first timestamp.

The difference between the second timestamp and the first timestamp can indicate the time period between when the user spoke the first word and the second word. More specifically, the time period can indicate a pause of a given length between the first word and the second word. In another implementation, the first machine learning model 304 can generate two or more timestamps for each word included in the transcription data. For example, for a given word, a first timestamp can be associated with the beginning of the word (e.g., a time associated with when a user begins to speak the word) and a second timestamp can be associated with the end of the word (e.g., a time associated with when the user is finished speaking the word). The first and second timestamps can be used to determine a time interval between words included in the transcription data, the duration of each word, and/or metrics associated with, for example, speech duration and/or rate.

The confidence data can include, for example, a set of confidence metrics (e.g., confidence scores), and each confidence metric from the set of confidence metrics can be associated with a different word from the set of words included in the transcription data. The first machine learning model 304 can generate a confidence metric for a transcribed word to indicate a level of certainty in the accuracy of the transcription for that word. For example, if the user clearly annunciates a word, and that word is represented clearly within the audio data, the confidence metric for that word can be high. Alternatively, if the user, for example, mumbles or slurs a word, or the word is muffled within the audio data, the first machine learning model 304 can interpret (e.g., classify) the word with less accuracy, leading to a lower confidence metric for that word. In some implementations, a plurality of confidence metrics for a plurality of words included in the transcription data can be combined (e.g., averaged, represented as a standard deviation, etc.) to produce a collective (e.g., average) confidence metric for the transcription data. In some implementations, multiple collective confidence metrics (e.g., average, mode, standard deviation, median, etc.) can be calculated based on the plurality of confidence metrics for the plurality of words.

The speaking metric generator 306 can be configured to receive the transcription data (and/or data associated with the transcription data) and the timestamp data generated by the first machine learning model 304 and, in response, generate at least one speaking metric. For example, based on the number of words included in the transcription data (and/or the number of syllables, etc., included in the transcript data) and the timestamp data for each word, the speaking metric generator 306 can generate at least one of a speaking rate (e.g., an average number of words spoken by the user per minute and/or other unit of time), an articulation rate (e.g., an average number of syllables spoken by the user per second and/or other unit of time), and/or any other measure of speaking pace.

The second machine learning model 308 can be configured to receive (1) the confidence metric(s) (e.g., the collective confidence metric(s), the set of confidence metrics for the set of words included in the transcription data and/or the average confidence metric for the transcription data) generated by the first machine learning model 304, (2) the speaking metric(s) generated by the speaking metric generator 306, and/or (3) additional inputs (e.g., the audio date included in the input data 302, the transcription data, etc.). Based on the confidence metric(s) and the speaking metric(s), the second machine learning model 308 can predict a listener effort metric. A listener effort metric can include, for example, a relative measure (e.g., on a scale of 0-100) of a listener's allocation of their mental resources to resolve ambiguity and/or errors included in the user's spoken dialogue. For example, in some implementations, a higher listener effort metric can indicate an increased level of unintelligibility (e.g., speech that is harder to understand as would be perceived by, for example, a speech-language pathologist) associated with the user's speech data included in the input data 302.

In some implementations, the speaking metric generator 306, by receiving the input data 302 as input, can be configured to identify acoustical features of the audio data included in the input data 302, and these acoustical features can be provided as input to the second machine learning model 308 to predict the listener effort metric. Examples of acoustical features can include a sound envelope metric (e.g., variations in sound envelope), a fundamental frequency, a jitter metric, a shimmer metric, a pitch metric, a formants metric (e.g., variations in the second vocal tract formant F2 computed, for example, using Parselmouth library), a formants variation (e.g., variant and/or derivate) metric, a harmonic-to-noise ratio (HNR), a Wiener entropy (or a similar entropy) metric, a Cepstral peak prominence (CPP) metric, and/or other acoustical features that can be indicative of bulbar decline. In some instances, the second machine learning model 308 can be configured to determine an acoustical feature(s) based on the audio data and without receiving the acoustical feature(s) as an input.

In some implementations, at least some of the foregoing acoustical features can be determined based on a spectrogram, which can represent a frequency decomposition of the input data 302 (e.g., the speech data). The spectrogram can be generated using the speaking metric generator 306 or another component of the speech analysis application 322, such as a machine learning model (e.g., a layer of the second machine learning model 308 and/or the like). The spectrogram can be provided as input to a machine learning model (e.g., a convolutional neural network (CNN), which can be included in and/or be a layer of the second machine learning model 308, as described below) to generate the acoustical feature(s), such as pitch, a formants metric(s), CPP, HNR, etc.).

In some implementations, an acoustical feature(s) (e.g., one or more of the foregoing acoustical features) can be selected from a plurality of acoustical features, and the selected acoustical feature(s) can be provided (and not, for example, any remaining acoustical features from the plurality of acoustical features) as an input to the second machine learning model 308 to predict the listener effort metric. In some implementations, the acoustical feature(s) can be selected from the plurality of acoustical features as part of training the second machine learning model 308. To select an acoustical feature from the plurality of acoustical features, an average value for each acoustical feature from the plurality of features can be determined for a given session (e.g., for a given passage reading) completed by a given user. After the given user has completed a plurality of sessions over a period of time, for each acoustical feature, average values can be determined for each session from the plurality of sessions. Also for each acoustical feature, a trajectory can be generated for the given user based on the plurality of average values associated with the plurality of sessions, and linear regression can be used determine slopes of the resulting trajectories associated with the plurality of acoustical features. An acoustical feature from the plurality of acoustical features can be determined to be significant if, for example, at least a threshold percentage (e.g., 5%) of users (e.g., a group of users that includes the given user, such as a group of patients) are associated with trajectories that are associated with that acoustical feature and that have slopes (e.g., an absolute value of the slope) that are greater than those observed in a control group. An acoustical feature that is determined to be significant can be calculated for another user (e.g., a user not included in the aforementioned group of users) and provided as an input to the second machine learning model 308 to predict a listener effort metric for that other user.

In some implementations, the second machine learning model 308 can be further configured to generate, based on the confidence metric(s), the speaking metric(s), and/or additional inputs (e.g., the audio date included in the input data 302, the transcription data, etc.), an overall dysarthria severity metric, a voice strain metric, a consistency metric (e.g., based on a word and/or phrase repeated multiple times by the user), an intelligibility metric, an articulatory precision metric, a dysphonia severity metric, a hypernasality metric, a breath support metric, a prosody metric, and/or the like. In some implementations, the second machine learning model 308 can be further configured to generate a disease quantification metric (e.g., a prognosis, a life expectancy metric, and/or the like) based on the listener effort metric and/or the like.

In some implementations, the second machine learning model 308 can include a Least Absolute Shrinkage and Selection Operator (Lasso) regression model and/or a model similarly suited for predicting and identifying relevant features in audio data to determine the listener effort metric. In some implementations, the second machine learning model 308 can include a neural network (e.g., a deep learning model configured to operate on audio data), a random forest model, a nearest neighbors model, and/or the like. In some implementations, the second machine learning model 308 can include a convolutional neural network (CNN) and/or a CNN layer that can generate the listener effort metric and/or an acoustical feature(s) (e.g., pitch, formants, CPP, HNR, etc.), based on a spectrogram (e.g., a spectrogram generated by the speaking metric generator 306 or another component of the speech analysis application 322, as described above). The listener effort metric and/or an acoustical feature(s) can then be used by the second machine learning model 308 (e.g., by a machine learning model that is included in the second machine learning model 308 and separate from the CNN) to generate the listener effort metric.

The second machine learning model 308 can be trained using training data generated by one or more health professionals (e.g., speech-language pathologists). For example, recorded speech data from a randomly selected participant can be presented to the health professional, and the health professional can assign a listener effort metric based on the health professional's experience. In some implementations, the health professional can assign the listener effort metric using a graphical user interface (GUI) (e.g., a GUI functionally and/or structurally similar to the GUI 600 of FIG. 6, described herein). This assigned listener effort metric can be used as ground truth data to train the second machine learning model 308.

The speech analysis application 322 can be configured to include in the output data 310 the listener effort metric generated by the second machine learning model 308. In some implementations, the output data 310 can be displayed and/or otherwise communicated to the user (e.g., via a compute device that is structurally and/or functionally similar to the user device 110 of FIG. 1).

In some implementations, the progression prediction application 324 can receive the listener effort metric as input to generate a progression rate, which can be included in the output data 310. For example, the progression prediction application 324 can include a third machine learning model 312, which can be configured to predict a progression rate based on the listener effort metric (e.g., a current listener effort metric) and at least one previous listener effort metric generated for the user prior to the current listener effort metric. Alternatively or in addition, the third machine learning model 312 can be configured to predict a progression rate for the user based on a progression rate(s) for another (e.g., similarly situated) user(s), such as another user that had a similar listener effort metric as the user. The progression rate can indicate a predicted change in the listener effort metric over a predefined time period (e.g., as measured from the time that the current listener effort metric was generated). Alternatively or in addition, the progression rate can indicate a prognosis (e.g., a predicted forecast of a symptom(s) over time, a likelihood of a disease outcome (e.g., mortality) for at least one future time (e.g., relative to generation of the prediction rate), etc.). The third machine learning model 312 can include, for example, a Mixture of Gaussian Processes (MoGP) model (and/or similarly suited unbiased machine learning model) to identify a user group (e.g., a cluster) associated with a similar progression rate as the user.

The speech analysis application can be further configured to, in response to predicting the progression rate, send a signal (e.g., to a compute device that is functionally and/or structurally similar to the user device 110 of FIG. 1) to cause display of a representation (e.g., a trendline) of the progression rate, the current listener effort metric, and/or the at least one previous listener effort metric.

The third machine learning model 312 can further implement groupwise comparisons of respective listener effort progression rates for a plurality of users. These groupwise comparisons can be performed using, for example, a linear mixed model with random effects. These groupwise comparisons can include, for example, at least one of a) controls versus participants with ALS to determine if there was a difference in listener effort change over time; b) controls versus participants with ALS and, for example a score of 4 on ALSFRS-RSE Q1 throughout their participation, to determine whether any change was seen in people found to have no change in speech by self-report; c) participants with bulbar-onset ALS versus non-bulbar-onset ALS to determine if the slopes of decline differ based on site of onset; d) participants with bulbar-onset ALS versus non-bulbar-onset ALS excluding participants with normal listener effort at the outset of the study, to determine whether, once bulbar symptoms have begun, the progression rate varies depending upon whether onset was bulbar or non-bulbar.

Figure 4:
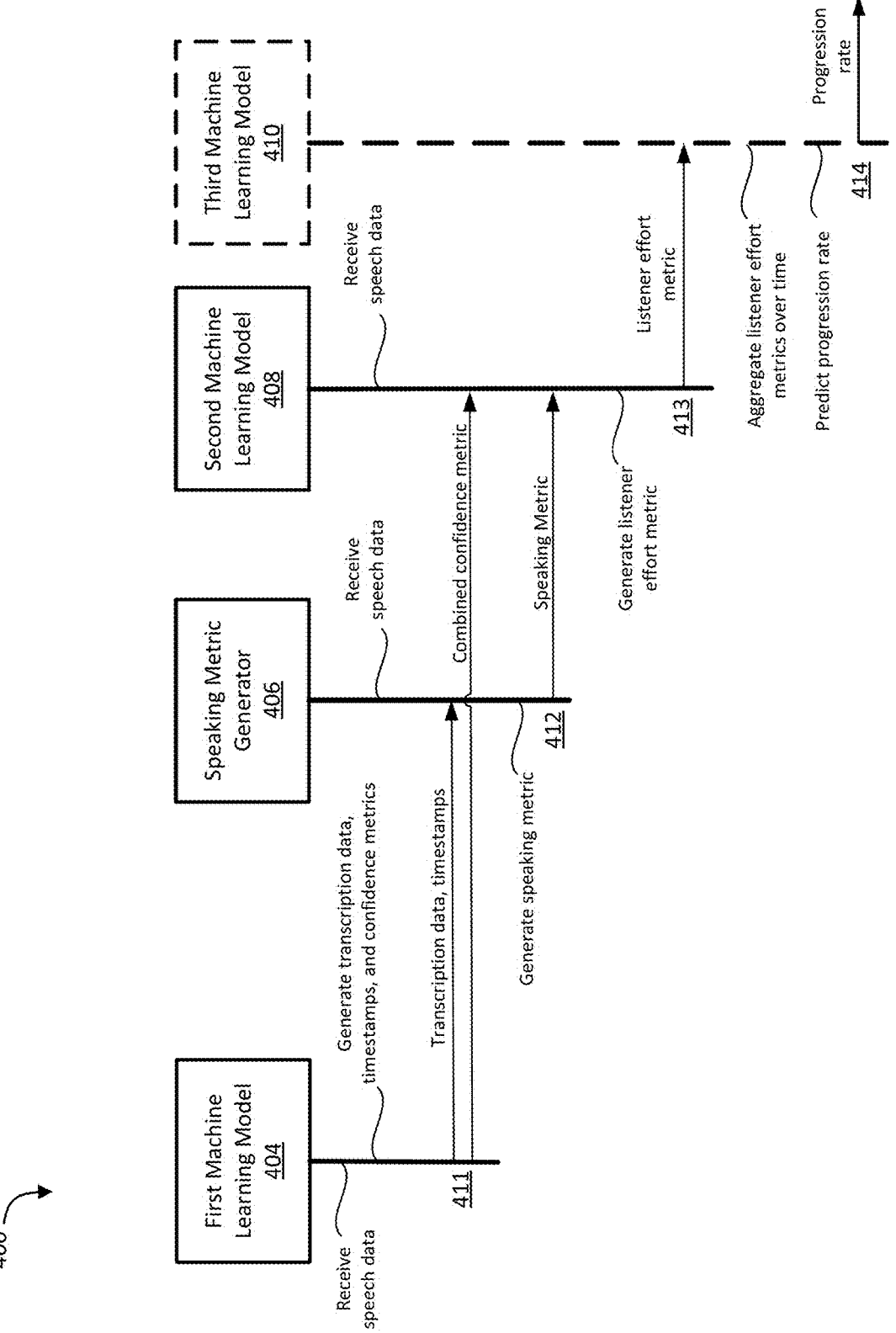
FIG. 4 is a signal diagram showing a plurality of interactions implemented by a speech analysis system, according to an embodiment.

FIG. 4 is a schematic diagram illustrating a plurality of interactions 411-414 (e.g., dataflow, transmissions, signals, etc.) between logic components 400 to generate metrics, predictions, trends, and/or the like, according to an embodiment. The logic components 400 can be associated with a compute device that is structurally and/or functionally similar to the compute device 201 of FIG. 2 and/or the compute device 120 of FIG. 1. In some instances, for example, the logic components 400 can be implemented as software stored in memory 210 and configured to be executed via the processor 220 of FIG. 2. For example, at least a portion of the logic components 400 can be included in a speech analysis application that is functionally and/or structurally similar to the speech analysis application 122 of FIG. 1 and/or the speech analysis application 222 of FIG. 2. In some instances, for example, at least a portion of the logic components 400 can be implemented in hardware. The logic components 400 include a first machine learning model 404 (which can be functionally and/or structurally similar to, for example, the first machine learning model 304 of FIG. 3), a speaking metric generator 406 (which can be functionally and/or structurally similar to, for example, the speaking metric generator 306 of FIG. 3), a second machine learning model 408 (which can be functionally and/or structurally similar to, for example, the second machine learning model 308 of FIG. 3), and, optionally, a third machine learning model 410 (which can be functionally and/or structurally similar to, for example, the third machine learning model 312 of FIG. 3).

The first machine learning model 404 can receive speech data (e.g., data similar to the input data 302 of FIG. 3) and generate, based on the speech data, at least one of transcription data, timestamp data, and/or a confidence metric(s) (e.g., a confidence metric for each word included in the transcription data). At 411, the transcription data and/or the timestamp data can be provided as input to the speaking metric generator 406, which can generate a speaking metric based on the transcription data and/or the timestamp data. Alternatively or in addition, in some implementations, the speaking metric generator 406 can receive the input data to generate the speaking metric (e.g., a metric(s) associated with a sound envelope and/or the like). Also at 411, one or more collective confidence metrics (e.g., an average, mode, standard deviation, median, etc. of a plurality of confidence metrics generated by the first machine learning model 404) can be provided as input to the second machine learning model 408, which can be configured to generate a listener effort metric. In some embodiments, although not shown in FIG. 4, the speech data received by the first machine learning model 404 can be received by the second machine learning model 408 with or without the speech data being processed by the first machine learning model 404 and/or the speaking metric generator 406. For example, the second machine learning model 408 can be configured to generate a listener effort metric based on the speech data, in addition to or without the collective confidence metric and/or the speaking metric being provided as input. In some implementations, the second machine learning model 408 can receive as input a spectrogram that represents the speech data. It should be appreciated that 411 and 412, or portions thereof, can be performed in any order. The second machine learning model 408 can be configured to output the listener effort metric (e.g., and cause the listener effort metric to be displayed on a screen, etc.).

Optionally, the listener effort metric generated by the second machine learning model 408 can be provided as input at 413 to the third machine learning model 410, which can aggregate listener effort metrics (e.g., a current listener effort metric and at least one previous listener effort metric) over time and predict a progression rate based on the set of aggregated listener effort metrics. At 414, a representation (e.g., a trend line(s)) of the progression rate (and/or the listener effort metric generated by the second machine learning model 408, previous listener effort metrics, etc.) can be output (e.g., as a visualization displayed to a user).

FIG. 5 is a flowchart showing a method 500 of using a speech analysis system to generate a listener effort metric, according to an embodiment. The method 500 can be implemented by a speech analysis system described herein (e.g., the speech analysis system 100 of FIG. 1). Portions of the method 500 can be implemented using a processor (e.g., the processor 220 of FIG. 2) of any suitable compute device (e.g., the compute device 201 of FIG. 2, and/or the user compute device 110 and/or the compute devices 120 of FIG. 1).

The method 500, at 502, includes receiving audio data. At 504, using a first machine learning model and based on the audio data, the following are generated: (1) transcription data, (2) timestamp data associated with the transcription data, and (3) a confidence metric associated with the transcription data. The method 500 at 506 includes calculating a speaking metric based on the transcription data and the timestamp data. Optionally, although not shown in FIG. 5, the speaking metric can be calculated based on the audio data. At 508, by providing the speaking metric and the confidence metric as an input to a second machine learning model, a listener effort metric is predicted.

Figure 6:
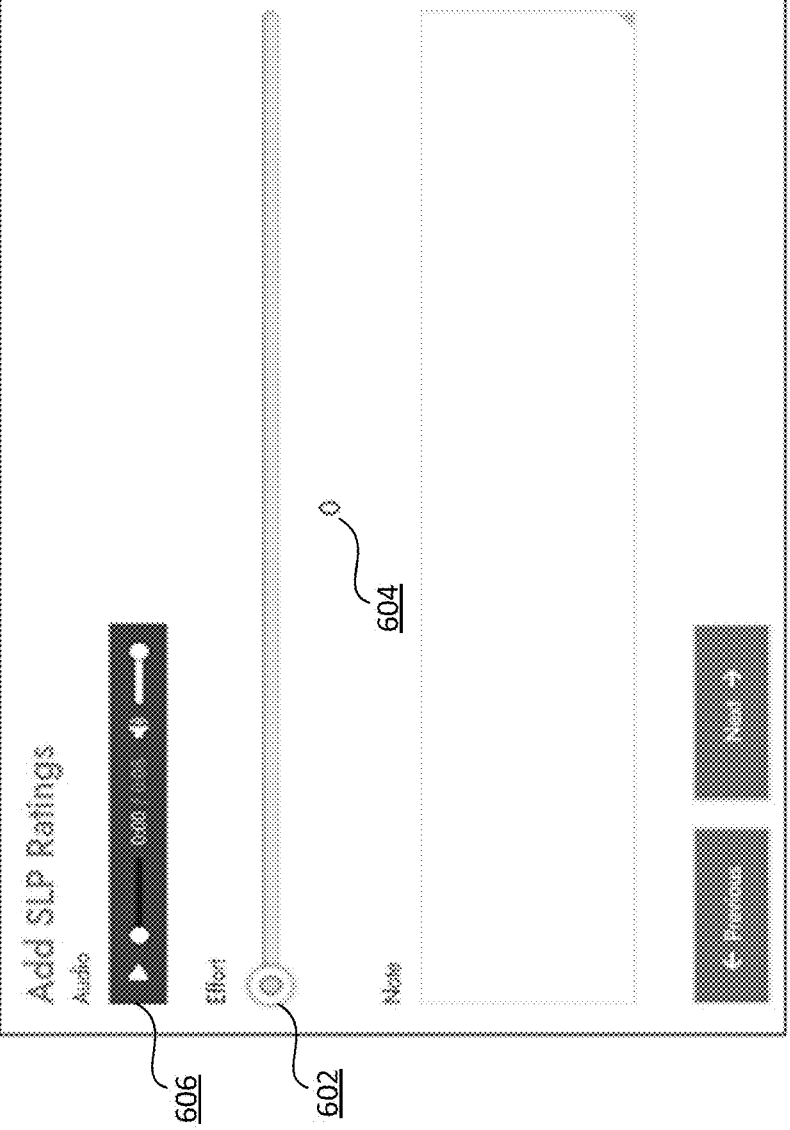
FIG. 6 depicts an example of a graphical user interface configured to permit a user to define ground truth data, according to an embodiment.

FIG. 6 depicts an example of a graphical user interface (GUI) 600 configured to permit a user (e.g., a health professional, such as a speech-language pathologist (SLP)) to define ground truth data (e.g., listener effort metric ground truth data), according to an embodiment. The GUI 600 can be implemented and/or displayed by a compute device that is structurally and/or functionally equivalent to the user device 110 of FIG. 1, the compute device 120 of FIG. 1, and/or the compute device 201 of FIG. 2. The GUI 600 includes a slider 602, a listener effort metric visualization 604, and an audio playback element 606. The slider 602 and the audio playback element 606 can each include a selectable element that the health professional can interact with and/or manipulate (e.g., using a mouse, touchscreen, etc.). As described herein, a health professional can manipulate the slider 602 to define a listener effort metric (e.g., by clicking, tapping, pressing, etc., the slider 602 and/or dragging the slider 602 translationally across the GUI 600). Based on the position of the slider 602, the listener effort metric visualization 604 can dynamically depict the listener effort metric value assigned by the speech professional. The health professional can assign the listener effort metric based on audio data to which the health professional can listen. Specifically, the health professional can trigger the audio data to play (e.g., via a speaker(s) operably coupled to the compute device that implements the GUI 600) by selecting the audio playback element 606. The audio data can include an audio recording of a patient (e.g., a patient afflicted with a neurodegenerative and/or motor neuron disease) that is speaking, such that the health professional can evaluate the patient and assign the patient the listener effort metric.

As described herein, the assigned listener effort metric can be used as ground truth data to train a machine learning model (e.g., a machine learning model that is structurally and/or functionally equivalent to the second machine learning model 308 of FIG. 3) to predict a listener effort metric based on audio data associated with another patient that is different from the patient associated with the assigned listener effort metric. Alternatively or in addition, the assigned listener effort metric can be provided as an input to a machine learning model (e.g., the second machine learning model 308 of FIG. 3) to generate an adjusted listener effort metric for the patient associated with the assigned listener effort metric. For example, the machine learning model can be configured to correct a health professional's bias and/or skewed interpretations based on assigned listener effort metrics defined by other health professionals and/or for other patients.

Figure 7:
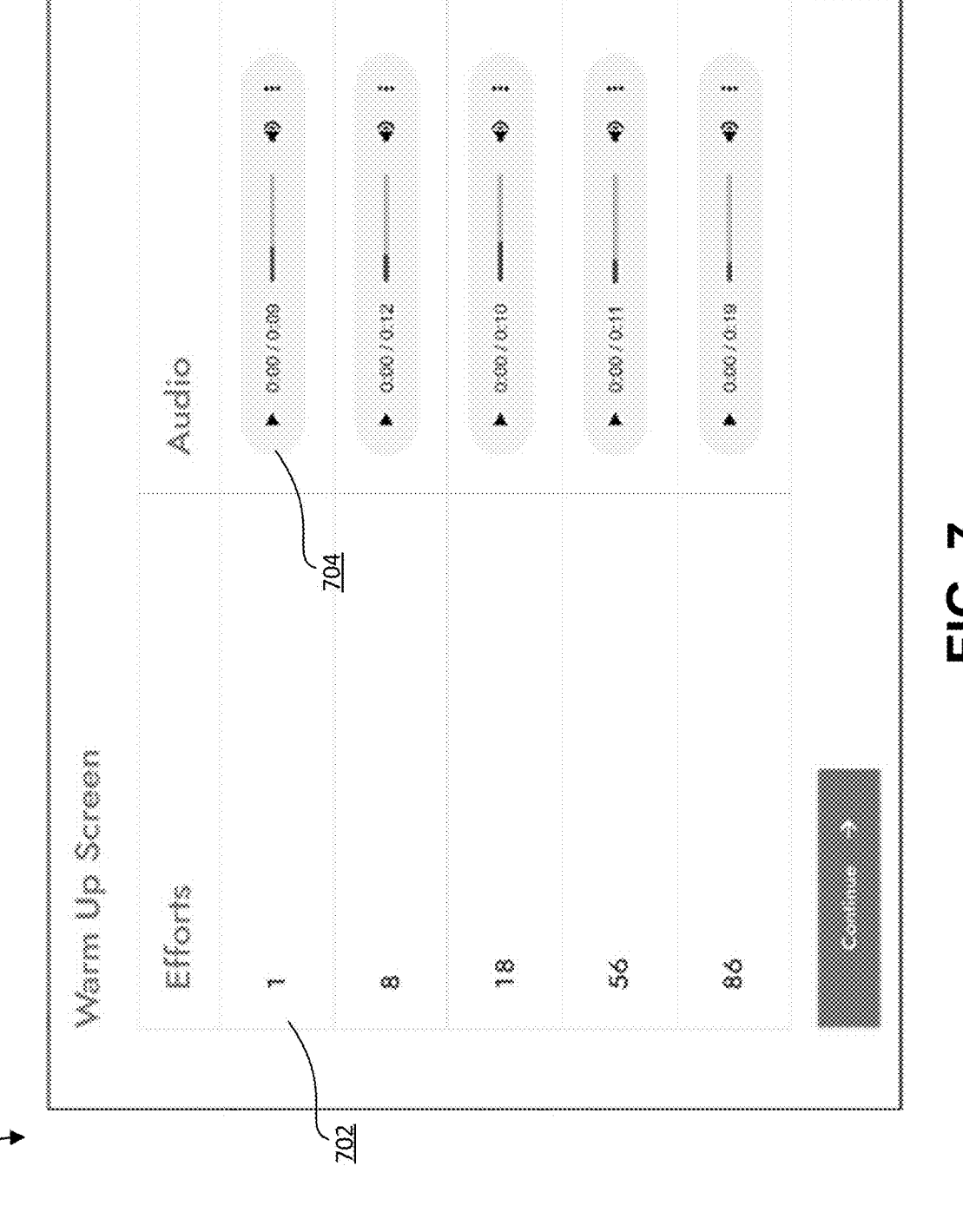
FIG. 7 depicts an example of graphical user interface configured to facilitate improved accuracy of ground truth data that is defined by a user.

FIG. 7 depicts an example of a graphical user interface (GUI) 700 configured to facilitate improved accuracy of ground truth data defined by a user. The GUI 700 can be implemented by a compute device that is structurally and/or functionally equivalent to the user device 110 of FIG. 1, the compute device 120 of FIG. 1, and/or the compute device 201 of FIG. 2. In some instances, the GUI 700 can be displayed (e.g., via a screen operably coupled to the compute device) to a health professional (e.g., a speech-language pathologist) before another GUI (e.g., a GUI that is structurally and/or functionally equivalent to the GUI 600 of FIG. 6) is displayed to the health professional. The GUI 700 includes a sample listener effort metric visualization 702 and an audio playback element 704. The health professional can use the GUI 700 to perform "warm-up" (e.g., calibration) exercises prior to defining listener effort metrics (e.g., via a GUI that is structurally and/or functionally equivalent to the GUI 600 of FIG. 6) that are to be used as ground truth data (e.g., to train a machine learning model that is structurally and/or functionally equivalent to the second machine learning model 308 of FIG. 3 and/or the second machine learning model 408 of FIG. 4). For example, the health professional can view the sample listener effort metric visualization 702 and manipulate and/or select the audio playback element 704 to cause an audio recording to be played via a speaker(s) operably coupled to the compute device. The audio recording can include a recording of a patient that is speaking, where that patient is associated with the listener effort metric depicted in the associated sample listener effort metric visualization 702 (e.g., the sample listener effort metric visualization 702 can be associated with the audio playback element 704 in the same row). By listening to the audio recording, the health professional can learn and/or adjust their perception of different listener effort metric values for different patient recordings, such that the health professional can more accurately assess and assign listener effort metric values themselves.

FIG. 8 is a flowchart showing a method 800 of using a speech analysis system to forecast a progression rate, according to an embodiment. The method 800 can be implemented by a speech analysis system described herein (e.g., the speech analysis system 100 of FIG. 1). Portions of the method 800 can be implemented using a processor (e.g., the processor 220 of FIG. 2) of any suitable compute device (e.g., the compute device 201 of FIG. 2, and/or the user compute device 110 and/or compute device 120 of FIG. 1).

The method 800 at 802 includes receiving speech data and, at 804, providing the speech data as input to a first machine learning model to produce (1) transcription data, (2) a set of confidence metrics for a set of words represented by the transcription data, and (3) timestamp data representing a speech rate. At 806, the method 800 includes providing the speech data, the transcription data, the set of confidence metrics, and the timestamp data as input to a second machine learning model to produce a listener effort metric. The listener effort metric is provided as input to a third machine learning model at 808 to forecast a progression rate.

FIG. 9 is a flowchart showing a method 900 of using a speech analysis system to produce a listener effort metric based on frequency decomposition of speech data, according to an embodiment. The method 900 can be implemented by a speech analysis system described herein (e.g., the speech analysis system 100 of FIG. 1). Portions of the method 900 can be implemented using a processor (e.g., the processor 220 of FIG. 2) of any suitable compute device (e.g., the compute device 201 of FIG. 2, and/or the user compute device 110 and/or compute device 120 of FIG. 1).

The method 900 at 902 includes receiving speech data and, at 904, performing a frequency decomposition of the speech data to produce spectrogram data. The spectrogram data is provided as input to a first machine learning model at 906 to produce acoustical feature data, and at 908, the acoustical feature data is provided as input to a second machine learning model to produce a listener effort metric.

In some embodiments, a non-transitory processor-readable medium stores instructions that, when executed by a processor, cause the processor to receive audio data and provide the audio data as input to a first machine learning model to generate (1) transcription data, (2) timestamp data associated with the transcription data, and (3) a confidence metric associated with the transcription data. A speaking metric is calculated based on the transcription data and the timestamp data. The speaking metric and the confidence metric are provided as input to a second machine learning model to predict a listener effort metric.

In some implementations, the non-transitory, processor-readable medium further stores instructions that cause the processor to provide the listener effort metric as input to a third machine learning model to predict a progression rate. In some implementations, the progression rate is associated with a change in the listener effort metric during a predefined time period. In some implementations, the progression rate is associated with a disease quantification for at least one of amyotrophic lateral sclerosis (ALS), Alzheimer's disease, Huntington's disease, or Parkinson's disease. In some implementations, the audio data includes speech data, and the first machine learning model is a speech recognition model.

In some implementations, the instructions to cause the processor to predict include instructions to cause the processor to predict the listener effort metric by providing as input to the second machine learning model, at least one of a fundamental frequency, a jitter metric, a shimmer metric, a formants variation metric, a Wiener entropy metric, or a Cepstral peak prominence metric, associated with the audio data. In some implementations, the second machine learning model is at least one of a Lasso regression model, a neural network, a random forest model, or a nearest neighbor model. In some implementations, the second machine learning model is trained based on a perceived listener effort metric received via a user interface. In some implementations, the confidence metric is a collective confidence metric, and the instructions to cause the processor to generate the collective confidence metric include instructions to cause the processor to generate the collective confidence metric based on a confidence metric associated with each word from a plurality of words included in the transcription data.

In some implementations, the listener effort metric is from a plurality of listener effort metrics associated with a user over a period of time, and the non-transitory, processor-readable medium further stores instructions that cause the processor to (1) calculate, using the plurality of listener effort metrics, a progression trend; and (2) send a signal to display to a user a representation of the progression trend. In some implementations, the non-transitory, processor-readable medium further stores instructions that cause the processor to send a signal to display to a user the listener effort metric.

In some embodiments, a method includes receiving speech data and providing the speech data as input to a first machine learning model to produce (1) transcription data, (2) a set of confidence metrics for a set of words represented by the transcription data, and (3) timestamp data representing a speech rate. The method further includes providing the speech data, the transcription data, the set of confidence metrics, and the timestamp data as input to a second machine learning model to produce a listener effort metric. The listener effort metric is provided as input to a third machine learning model to forecast a progression rate.

In some implementations, the first machine learning model includes an encoder-decoder model. In some implementations, the second machine learning model is a Least Absolute Shrinkage and Selection Operator (Lasso) regression model. In some implementations, the third machine learning model includes a mixture of Gaussian processes (MoGP) model. In some implementations, the method further includes providing the speech data as input to a fourth machine learning model to produce at least one of a dysarthria severity metric, a voice strain metric, a consistency metric, an intelligibility metric, an articulatory precision metric, a dysphonia severity metric, a hypernasality metric, a breath support metric, or a prosody metric.

In some embodiments, a non-transitory, processor-readable medium stores instructions that, when executed by a processor, cause the processor to receive speech data and perform a frequency decomposition of the speech data to produce spectrogram data. The spectrogram data is provided as input to a first machine learning model to produce acoustical feature data, and the acoustical feature data is provided as input to a second machine learning model to produce a listener effort metric.

In some implementations, the first machine learning model includes a convolutional neural network (CNN). In some implementations, the acoustical feature data represents at least one of a sound envelope metric, a fundamental frequency, a jitter metric, a shimmer metric, a pitch metric, a formants metric, a formants variation metric, a harmonic-to-noise ratio (HNR), a Wiener entropy metric, or a Cepstral peak prominence (CPP) metric. In some implementations, the non-transitory, processor-readable medium further stores instructions to cause the processor to provide the listener effort metric as in input to a mixture of Gaussian processes (MoGP) model to predict a progression rate.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A non-transitory, processor-readable medium storing instructions that, when executed by a processor, cause the processor to:

receive audio data associated with a person;

provide the audio data as input to a first machine learning model to generate (1) transcription data, (2) timestamp data associated with the transcription data, and (3) a confidence metric that represents an accuracy of the transcription data relative to the audio data;

calculate a speaking metric based on the transcription data and the timestamp data; and predict, by providing the speaking metric and the confidence metric as input to a second machine learning model, a listener effort metric that is from a perspective other than that of the person and that indicates a level of dysarthria associated with the person.

2. The non-transitory, processor-readable medium of claim 1, further storing instructions that cause the processor to provide the listener effort metric as input to a third machine learning model to predict a progression rate associated with the dysarthria of the person.

3. The non-transitory, processor-readable medium of claim 2, wherein the progression rate is associated with a change in the listener effort metric during a predefined time period.

4. The non-transitory, processor-readable medium of claim 2, wherein the progression rate is associated with a disease quantification for at least one of amyotrophic lateral sclerosis (ALS), Alzheimer's disease, Huntington's disease, or Parkinson's disease.

5. The non-transitory, processor-readable medium of claim 1, wherein:

the audio data includes speech data; and the first machine learning model is a speech recognition model.

6. The non-transitory, processor-readable medium of claim 1, wherein the instructions to cause the processor to predict include instructions to cause the processor to predict the listener effort metric by providing as input to the second machine learning model, at least one of a fundamental frequency, a jitter metric, a shimmer metric, a formants variation metric, a Wiener entropy metric, or a Cepstral peak prominence metric, associated with the audio data.

7. The non-transitory, processor-readable medium of claim 1, wherein the second machine learning model is at least one of a Lasso regression model, a neural network, a random forest model, or a nearest neighbor model.

8. The non-transitory, processor-readable medium of claim 1, wherein the second machine learning model is trained based on a perceived listener effort metric received via a user interface.

9. The non-transitory, processor-readable medium of claim 1, wherein the confidence metric is a collective confidence metric, the instructions to cause the processor to generate the collective confidence metric include instructions to cause the processor to generate the collective confidence metric based on a confidence metric associated with each word from a plurality of words included in the transcription data.

10. The non-transitory, processor-readable medium of claim 1, wherein the listener effort metric is from a plurality of listener effort metrics associated with the person over a period of time, the non-transitory, processor-readable medium further storing instructions that cause the processor to:

calculate, using the plurality of listener effort metrics, a progression trend; and send a signal to display to a user a representation of the progression trend.

11. The non-transitory, processor-readable medium of claim 1, further storing instructions that cause the processor to send a signal to display to a user the listener effort metric.

12. A method, comprising:

receiving speech data that represents a set of words spoken by a person;

providing the speech data as input to a first machine learning model to produce (1) transcription data that represents the set of words, (2) a set of confidence metrics for the set of words, and (3) timestamp data representing a speech rate;

providing the speech data, the transcription data, the set of confidence metrics, and the timestamp data as input to a second machine learning model to produce a listener effort metric that quantifies an effort to listen to the person; and providing the listener effort metric as input to a third machine learning model to forecast a progression rate of a condition for the person.

13. The method of claim 12, wherein:

the first machine learning model includes an encoder-decoder model.

14. The method of claim 12, wherein:

the second machine learning model is a Least Absolute Shrinkage and Selection Operator (Lasso) regression model.

15. The method of claim 12, wherein:

the third machine learning model includes a mixture of Gaussian processes (MoGP) model.

16. The method of claim 12, further comprising:

providing the speech data as input to a fourth machine learning model to produce at least one of a dysarthria severity metric, a voice strain metric, a consistency metric, an intelligibility metric, an articulatory precision metric, a dysphonia severity metric, a hypernasality metric, a breath support metric, or a prosody metric.

17. A non-transitory, processor-readable medium storing instructions that, when executed by a processor, cause the processor to:

receive speech data for a person who has a condition;

perform a frequency decomposition on the speech data to produce spectrogram data;

provide the spectrogram data as input to a first machine learning model to produce acoustical feature data; and provide the acoustical feature data as input to a second machine learning model to produce a listener effort metric (1) from a perspective other than that of the person and (2) that quantifies the condition of the person.

18. The non-transitory, processor-readable medium of claim 17, wherein:

the first machine learning model includes a convolutional neural network (CNN).

19. The non-transitory, processor-readable medium of claim 17, wherein:

the acoustical feature data represents at least one of a sound envelope metric, a fundamental frequency, a jitter metric, a shimmer metric, a pitch metric, a formants metric, a formants variation metric, a harmonic-to-noise ratio (HNR), a Wiener entropy metric, or a Cepstral peak prominence (CPP) metric.

20. The non-transitory, processor-readable medium of claim 17, further storing instructions to cause the processor to:

provide the listener effort metric as in input to a mixture of Gaussian processes (MoGP) model to predict a progression rate associated with the condition.

* * * * *